(Model.)
D. J. ARNOLD.
END GATE.
No. 279,687. Patented June 19, 1883.
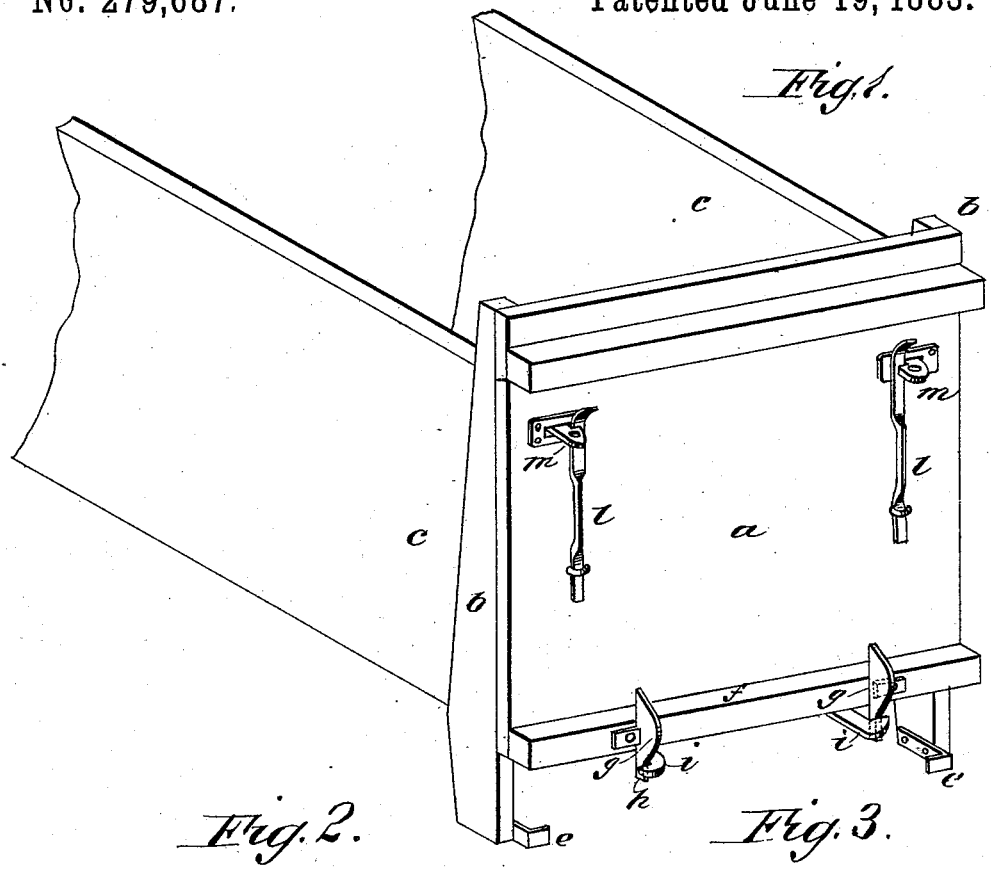
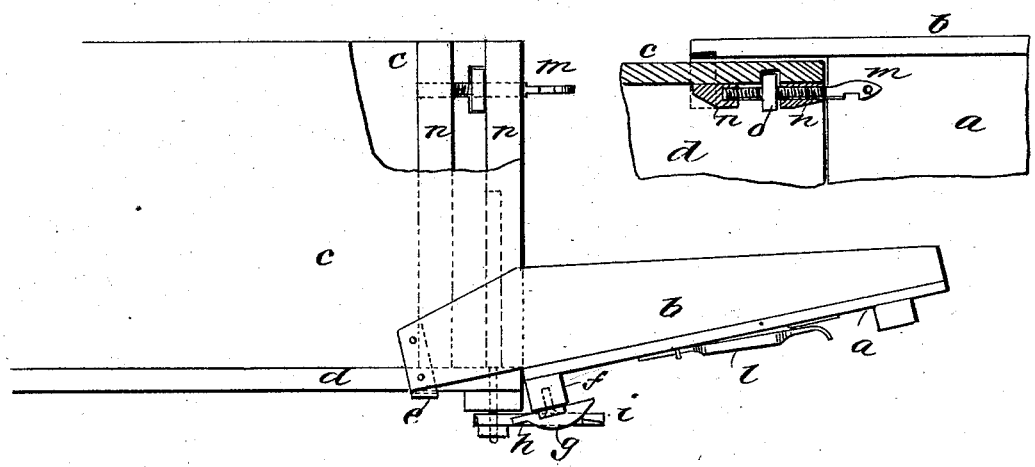
WITNESSES:
Francis McArdle.
C. Sedgwick
INVENTOR:
D. J. Arnold
BY Munn & Co
ATTORNEYS.

UNITED STATES PATENT OFFICE.

DON JUAN ARNOLD, OF BROWNVILLE, NEBRASKA.

END-GATE.

SPECIFICATION forming part of Letters Patent No. 279,687, dated June 19, 1883.

Application filed April 19, 1883. (Model.)

*To all whom it may concern:*

Be it known that I, DON JUAN ARNOLD, of Brownville, in the county of Nemaha and State of Nebraska, have invented a new and Improved End-Gate, of which the following is a full, clear, and exact description.

My invention consists of an improved contrivance for securing the end-gate, so that it may be readily let down to be used for a scoop-board for shoveling out the contents of the box, the said contrivance being also adapted for enabling the end-gate to be readily taken off and put on and be securely fastened when applied to the rest of the box, all as hereinafter fully described.

Reference is to be had to the accompanying drawings, forming part of this specification, in which similar letters of reference indicate corresponding parts in all the figures.

Figure 1 is a perspective view of a portion of a wagon-box with an end-gate of my contrivance. Fig. 2 is a side elevation with a part of one of the sides of the box broken out, the end-gate being let down in the position for use as a scoop-board; and Fig. 3 is a detail in horizontal section of one of the side-boards and plan of part of the end-gate when let down.

I construct the end-gate $a$ with side pieces, $b$, extending forward and overlapping the sides $c$ of the box to some extent, also projecting below the bed $d$, and having catches $e$, which hook under the bed and form stops to hold the end-gate when swung down, as in Fig. 2, the gate being also supported behind the bed at the same time by the bar $f$, or the shank-plate $g$ of the stop-hooks $h$, attached to said bar, resting on the strong hooks $i$, attached to the under side of the bed, and projecting backward from it for the purpose, and also to hold the lower edge of the end-gate in position, when the gate is closed up, to the ends of the sides of the box, where it is to be fastened by the spring-latches $l$, which snap into the hooks $m$, projecting through the end-gate from the cleats $n$ of the sides, through which they extend, to be fastened by a nut, $o$, located between the cleats, and in which the hooks are to be screwed for adjusting them to hold the gate up tight. The heads of the hooks that extend through the end-gate are flat, and the holes for them in the end-gate are correspondingly shaped to prevent the hooks from turning.

Pins may be used to fasten up the end-gate by placing them in holes in the hook-heads, the spring-latches being used or not, as preferred. These spring-latches are arranged vertically on the end-gate to prevent them from shaking or rattling out of place.

The shank-plates $g$ of the stop-hooks are constructed in the oval form represented for riding down on the hooks $i$ when the gate is lowered; but they may be dispensed with, the stop-hooks being simply contrived to lock the gate fast when closed up against the ends of the side-boards. It will be readily seen this contrivance affords a ready means of fastening and unfastening the gate, and it also provides a substantial scoop-board on which a person may stand to scoop out the load, the said scoop-board being adapted to receive and retain any part of the load of loose material that may fall with it when it is lowered for the purpose of unloading the wagon.

Having thus described my invention, what I claim as new, and desire to secure by Letters Patent, is—

1. The end-gate having the hooks $h$, provided with the oval shank-plates $g$, said gate also having the spring-latches $l$, in combination with the hooks $i$, projecting from the under side of the bed, and the hooks $m$, substantially as and for the purpose set forth.

2. The end-gate having the stop-hooks $h$, provided with the oval shank-plates $g$, the extension-sides $b$, and the L-shaped catch-hooks $e$, affixed to the lower ends of the extension sides $b$, and adapted to catch on the under side of and in combination with the bed $d$, having hooks $i$, substantially as and for the purpose set forth.

3. The stop-hooks $h$, having oval shank-plates $g$, in combination with end-gate $a$ and hooks $i$, substantially as described.

4. The end-gate having the rectangular slots and the spring-latches $l$, in combination with the hooks $m$, with flat or angular shanks and screw-threaded portions, the same bearing in the cleats $n$ of the sides of the bed, and the nuts $o$, arranged to operate the hooks $m$, substantially as and for the purpose set forth.

DON JUAN ARNOLD.

Witnesses:
J. B. DOCKER,
L. H. FORT.